United States Patent [19]

La Conte

[11] 4,383,347
[45] May 17, 1983

[54] FOUR-BAR LINKAGE DOOR HINGE

[75] Inventor: Richard J. La Conte, Auburn, Wash.

[73] Assignee: The Boeing Company, Seattle, Wash.

[21] Appl. No.: 238,252

[22] Filed: Feb. 25, 1981

[51] Int. Cl.³ ............................................. E05D 15/32
[52] U.S. Cl. ........................................ 16/360; 16/370
[58] Field of Search .................... 16/370, 288, DIG. 1, 16/360

[56] References Cited

U.S. PATENT DOCUMENTS 3,051,280  8/1962  Bergman et al. .................. 16/370 X
3,351,975 11/1967  Goto ..................................... 16/288

FOREIGN PATENT DOCUMENTS 496829 12/1938 United Kingdom ................... 16/370

*Primary Examiner*—Werner H. Schroeder
*Assistant Examiner*—Andrew M. Falik
*Attorney, Agent, or Firm*—H. Gus Hartmann; Bernard A. Donahue

[57] ABSTRACT

A hinge mechanism for a door on an overhead baggage compartment which is generally located in the passenger section of an airliner and utilized by passengers for the stowage of carry-on luggage. The door hinge mechanism comprises, an unequal length four-bar linkage mechanism which produces a compound motion to the door for swinging it into the standing room area of the passenger section when it is moved to the open position. An ordinary four-bar linkage mechanism would have two pairs of equal length links and their operation would be designed around two fixed pivot points. However, in this disclosure there is only one fixed pivot point and the other of the generally fixed pivots, is a walking pivot which is guided by a cam device to profile the travel of the door.

6 Claims, 7 Drawing Figures

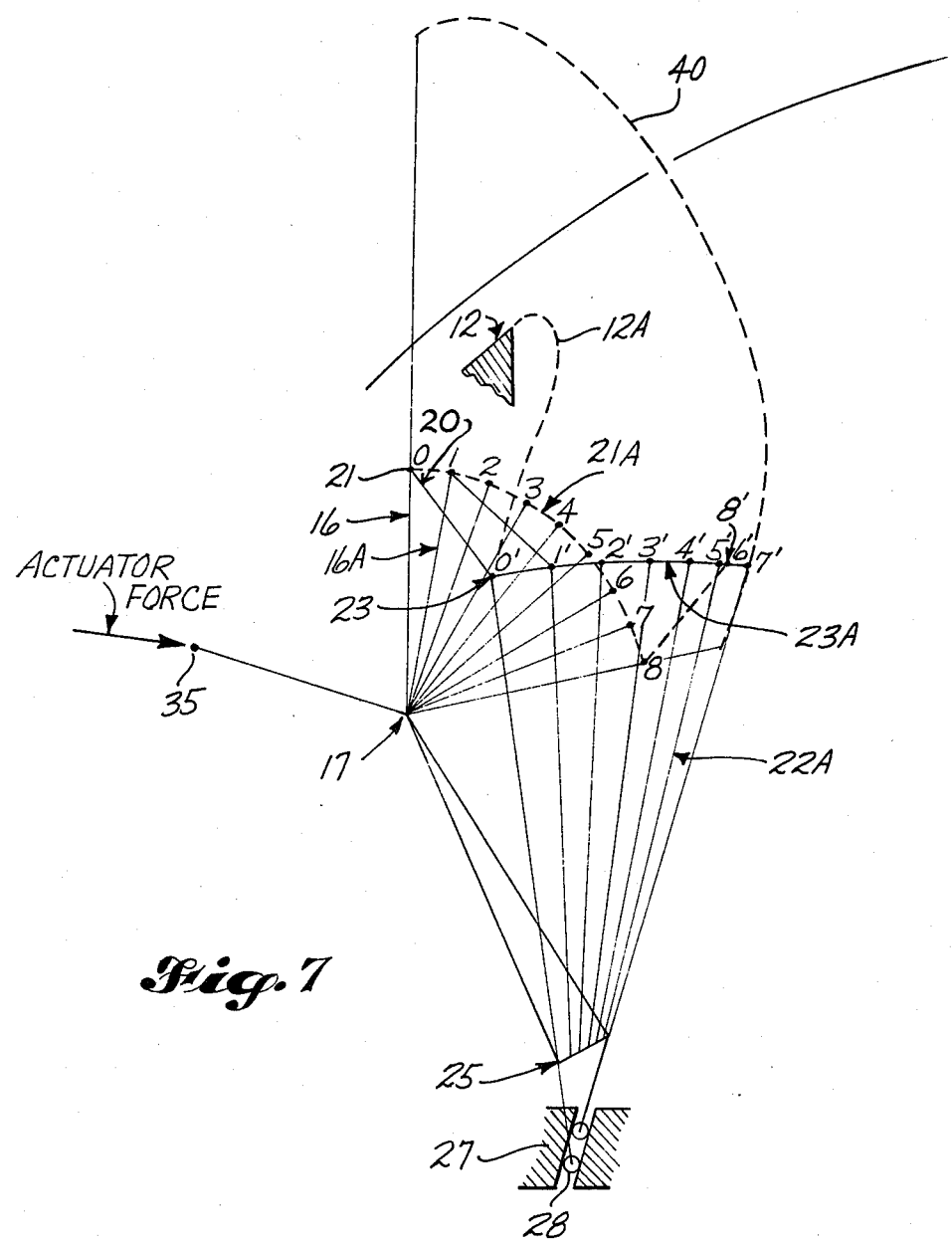

FOUR-BAR LINKAGE DOOR HINGE

SUMMARY OF THE INVENTION

The invention relates to a hinge mechanism for the door of an overhead compartment for the stowage of carry-on luggage by passengers of an airliner and more particularly, to a hinge mechanism which relies upon the interaction of a cam and an unequal length four-bar linkage, that functions in a combined manner to rotate the door from a closed position through approximately ninety degrees to an open position above the standing room area of the passenger section.

An object of the present invention is to provide an imaginary hinge point in space with the more natural feel of a single pivot type of door hinge for passengers operating the stowage compartment door, even though the actual hinge comprises a four-bar linkage having a walking pivot guided by a cam and follower mechanism.

BRIEF DESCRIPTION OF THE DRAWINGS

FIG. 7 is a plot of the instantaneous center-of-rotation of the door and its hinging mechanism.

DESCRIPTION OF THE PREFERRED EMBODIMENT

Figure 1:
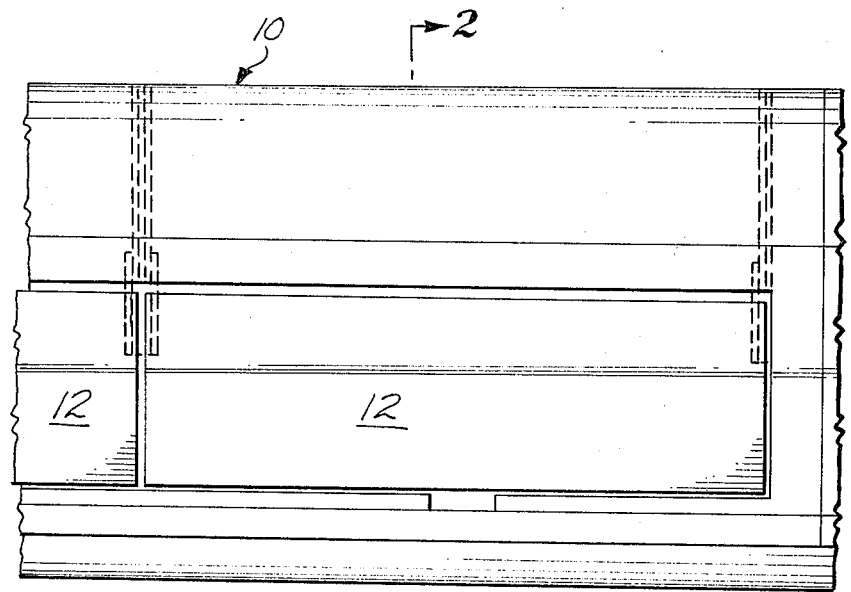
FIG. 1 is a front view of a portion of an overhead baggage compartment for the stowage of carry-on luggage by passengers.

FIG. 1 is a partial front view of an overhead bin 10 having a compartment 11 for stowage of carry-on luggage by passengers on an airliner. The stowage compartment has two doors which open up to a single width compartment of approximately ninety inches without any fixed partition between the two doors. Each door has a pair of hinge mechanisms for operating support and these hinge mechanisms protrude into the stowage compartment which is a slight disadvantage to this arrangement, particularly of the central hinges, in limiting the height of luggage that will fit thereunder. However, each hinge mechanism has an enclosure to prevent articles from becoming wedged between the linkage of the four-bar mechanism and jamming the door in the closed position.

Figure 2:
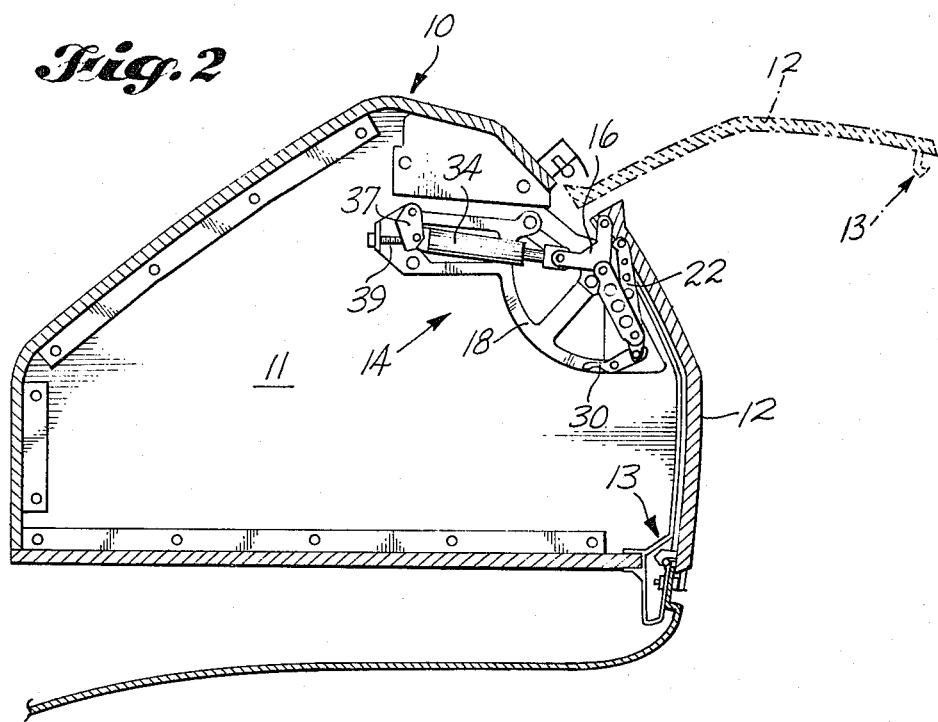
FIG. 2 is a cross-sectional side view of the baggage compartment shown in FIG. 1 taken as indicated by the line 2—2.

FIG. 2 is a cross-sectional side view taken in the direction indicated by the line 2—2 of FIG. 1 and shows the hinge arrangement 14 of the invention, with the door 12 at a fully closed position. The door 12 is held in the closed position by a latch 13 at the bottom of the door.

Figure 3:
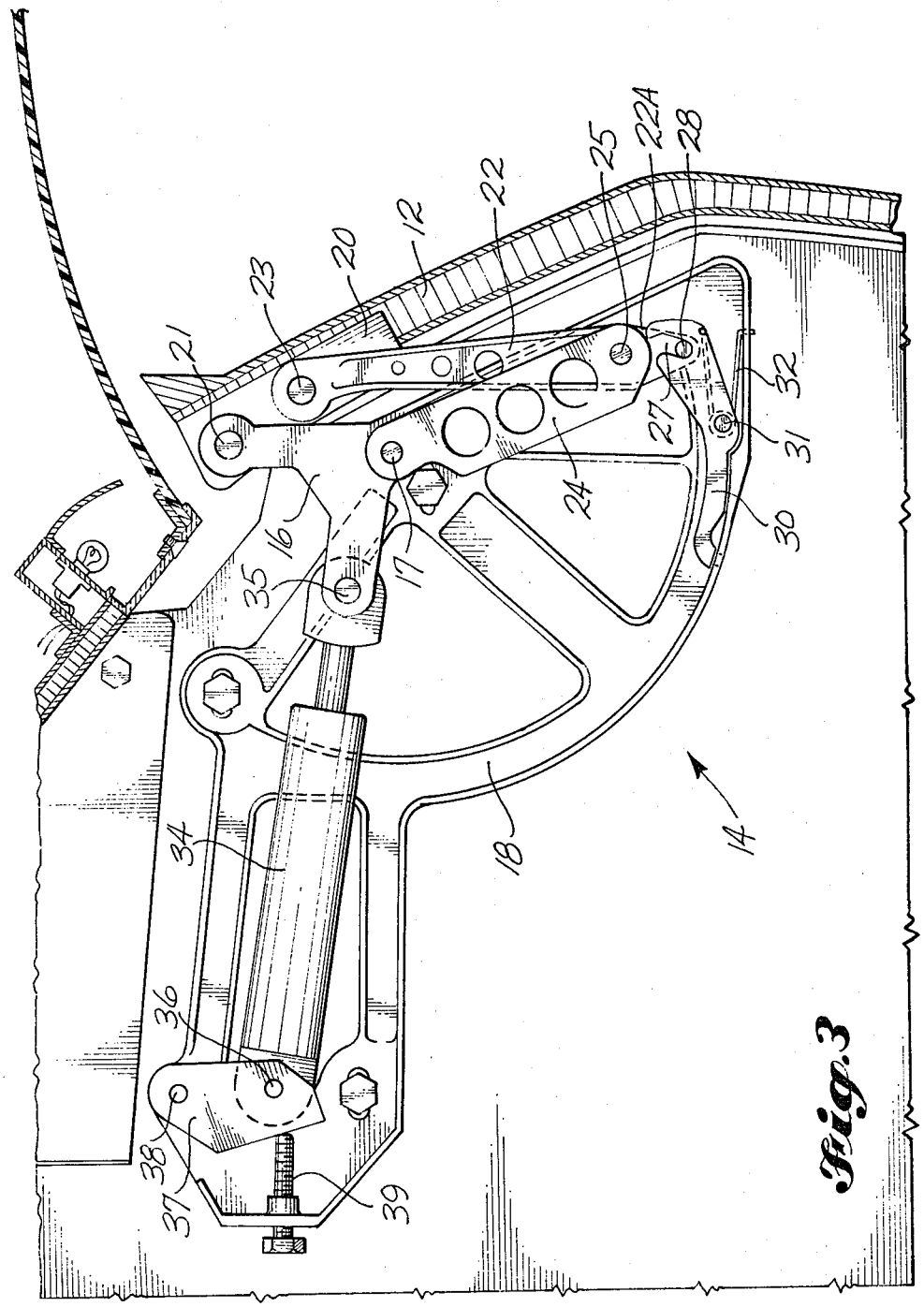
FIG. 3 is an enlarged cross-sectional side view of the baggage compartment door hinging mechanism, similar to FIG. 2, and shows the door in the closed position.
Figure 4:
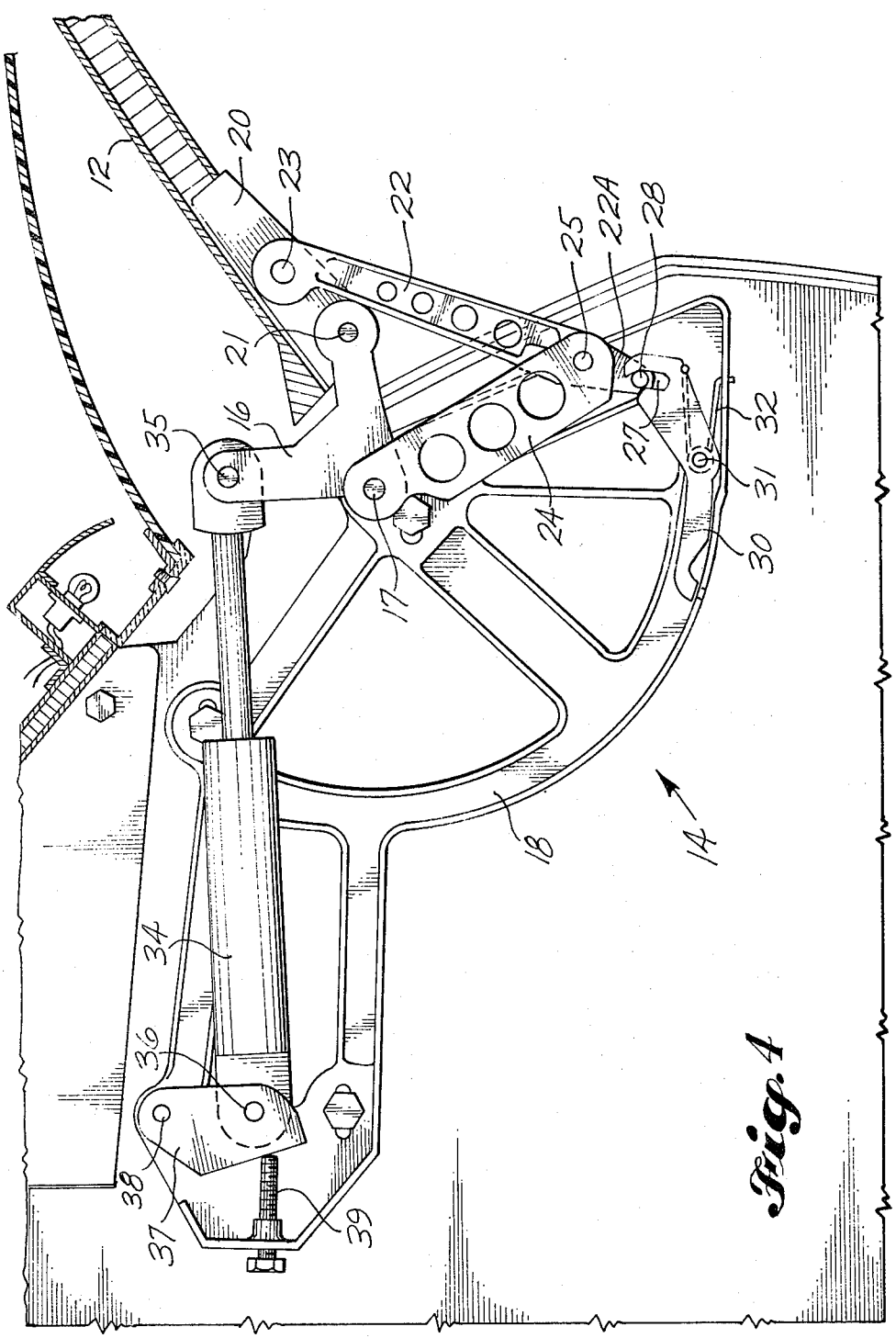
FIG. 4 is a view similar to FIG. 3 with the door at a fully open position to provide a complete face opening into the stowage compartment.
Figure 5:
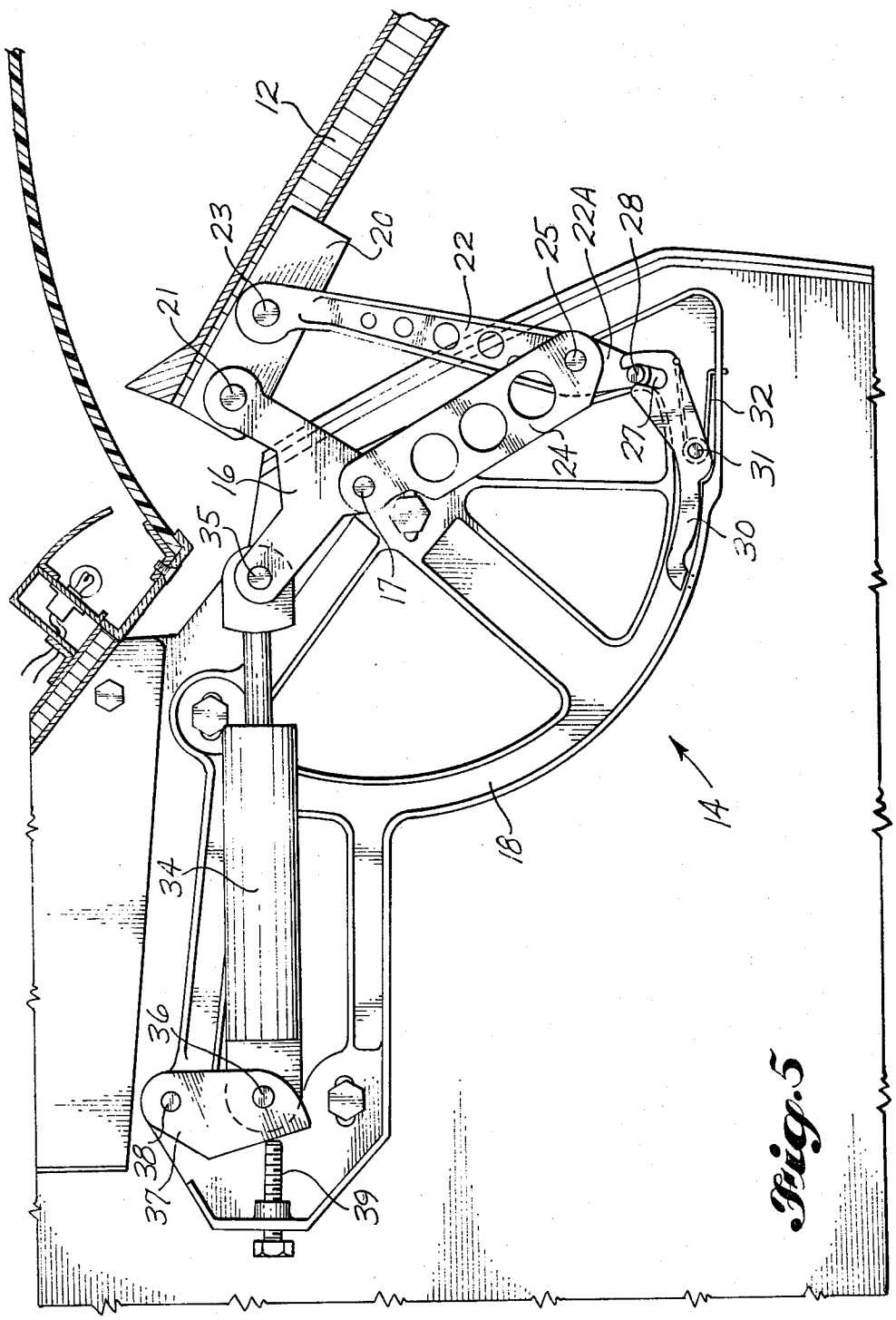
FIG. 5 is a view similar to FIGS. 3 and 4 with the door in an intermediate position.

FIGS. 3, 4, 5 and 6 are enlarged cross-sectional side views of the hinge arrangement 14 of the invention, similar to FIG. 2, and more clearly depicts the hinge mechanism with the door 12 at four positions, i.e.: FIG. 3, a fully closed and latched position; FIG. 4, a fully open position; FIG. 5 an intermediate position; and FIG. 6, a lowered position for access to lighting fixtures over the baggage compartment.

Referring to FIGS. 2-6, the baggage compartment door hinge system 14 comprises an unequal length four-bar linkage which is guided throughout its operating cycle by a cam and follower mechanism. The four-bar linkage comprises: a first link 16 formed by a bellcrank which is pivotally mounted at 17 to fixed support structure 18; a second link 20 forming a bracket which is fixed along the door 12 and is pivotally connected at 21 to one arm of bellcrank 16; a third link 22 pivotally connected at its upper end 23 to the door bracket second link 20; and a fourth link 24 pivotally connected at its lower end 25 to the lower portion of the third link 22 and said fourth link 24 being pivotally mounted at its upper end 17 in axial alignment with the pivotal mounting of the bellcrank 16 to fixed support structure 18.

The lower portion of third link 22 has an extension segment 22A, to which a cam follower 28 is connected; and this cam follower 28 engages a camtrack slot 27 which is formed integral with a lever 30 pivoted at 31 to the fixed support structure 18. The camtrack 27 and follower 28, guide the travel of pivot point 25 through a predetermined arc as the door 12 is opened, the profiles the door opening trace such that the door as a whole is raised in combination with being rotated to its optimum open position. If pivot point 25 were kept fixed, then the door as a whole would be at a much lower position when fully open. Also, raising the door as it is opened, provides a larger face opening into the stowage compartment.

A typical four-bar linkage mechanism would have the bellcrank arm first link 16 and the third link 22, as equal length primary links and these links would have fixed pivots at both 17 and 25 respectively. However, in the present invention these links are of unequal length and one of these primary links, namely 22, has a walking pivot point 25 that is guided by the camtrack slot 27 and follower 28 arrangement.

In operation, the door 12 is held in the closed position shown in FIGS. 2 & 3 by the latch 13 at the bottom of the door; and when the latch 13 is released, an energizing device, such as a compressed spring actuator 34, moves the door to the raised position shown in FIG. 4. The actuator 34 is pivotally connected at one end 35 to the bellcrank arm first link 16 and the other end 36 is pivotally connected to a support link 37 which is hinged on pivot 38 fixed to support structure 18. Adjustable stop means 39 interacts between the fixed support structure 18 and the swinging end of support link 37 for adjusting the open position of the door 12. By holding the bellcrank arm first link 16 on the fixed pivot 17 and the arc of travel of the fourth link 24 about the same pivot point 17, the unequal length four-bar linkage hinge mechanism creates an imaginary center-of-rotation or hinge pivot in space in order to profile the door action so that the upper edge of the door is rotated outward and downward as the door is opened.

Figure 6:
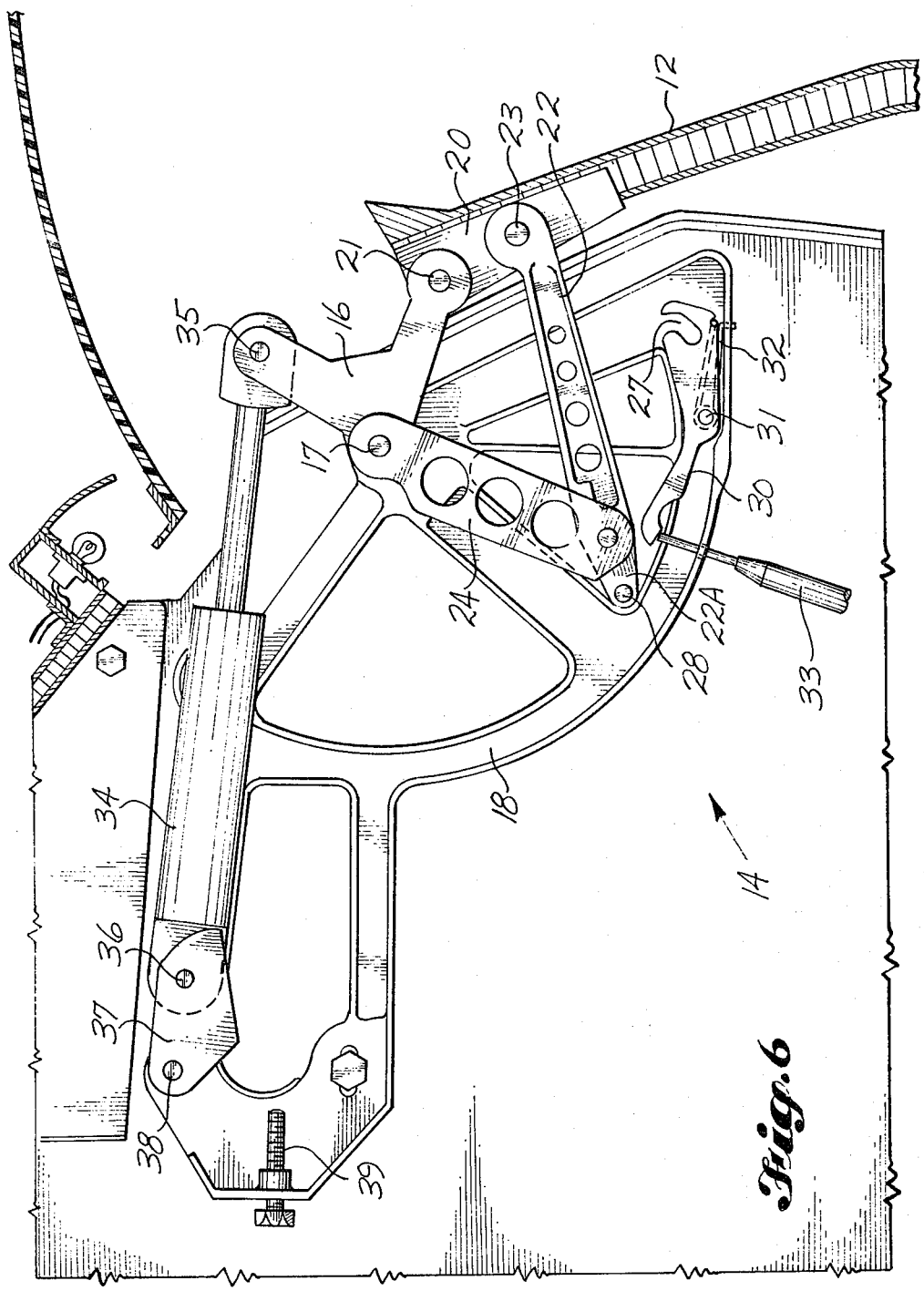
FIG. 6 is a view similar to FIG. 3 with the camtrack disengaged and the door lowered to a position for access to overhead lighting fixtures.

FIG. 6 shows another feature of the invention that improves serviceability of the airplane, i.e. dropping the door 12 to a secondary position in order to provide access to overhead lighting ceiling panels for bulb replacement. With the door 12 in the raised position shown in FIG. 4, a tool 33, such as a rod or pin, is inserted through a cover flange of the support structure 18, and pushed up against the handle of lever 30 which has a spring 32 that biases lever 30 to the position depicted in FIGS. 3, 4 and 5; and this rotates lever 30 to the position depicted in FIG. 6, thereby releasing the follower 28 from engagement with the camtrack slot 27 and permitting the four-bar linkage mechanism to rotate about the fixed pivot 17 to the position shown in FIG. 6; and in which position, the entire door 12 has been dropped down to the lower position. Then to reset the door 12, it is manually raised and the follower 28 rides along the upper edge of lever 30 and automatically latches into engagement with camtrack slot 27 for normal door operation.

FIG. 7 is a plotted kinematic layout describing the action of the door, and is utilized in designing the cam action and geometric linkage arrangement of the door. When the door is unlatched at 13, the force of actuator 34 acts on the first link 16 and drives it through the radial motion indicated by the radial lines 16A and pivot trace 23A. Links two 20, three 22, and four 24, follow the movement of the first link 16 and are positioned by the camtrack 27 and follower 28, and produce a resultant trace of pivotal connection 23 shown by the line 23A. The second link 20 attached to the door 12, provides the connection between traces 21A and 23A and drives the inner edge of the door through the trace indicated by dashed line 12A. This motion and the trace of the instantaneous center-of-rotation 40 can be profiled, as required, by profiling the camtrack 27 to produce the required motion. The instantaneous center-of-rotation 40 is an imaginary point in space created by the projected intersection of first link 16 and third link 22 at any given point of motion; and it should be profiled to maintain itself to as small an area as possible in order to reduce the possibility of the door racking and to retain the feel of a single point hinge.

While the invention has been disclosed with reference to a preferred embodiment, it is to be understood that those modifications and changes which become obvious to a person skilled in the art to which this invention pertains, as a result of the teaching hereof, are considered to be encompassed by the following claims.

I claim:

1. A cam guided four-bar linkage mechanism for profiling the hinging operation of a door, comprising: a first link having a pivot at one end fixed to door support structure; a second link fixedly fastened along the door surface and pivotally connected at one end to the swinging end of said first link; a third link pivotally connected at one end to the other end of said second link; a fourth link having a fixed pivot mounting at one end in axial alignment with said first link pivot which is fixed to door support structure, and said fourth link having its swinging end pivotally connected to the other end portion of said third link; a camtrack mounted to fixed door support structure; a cam follower mounted to said third link and operatively engaging said camtrack for guiding the four-bar linkage mechanism to profile the opening and closing operation of the door; and said first and third links being geometrically arranged to produce an imaginary projected intersection thereof throughout the opening and closing operation of the door, and which projected intersection is profiled by said camtrack to be retained within a limited area for producing the feel of a single point door hinge.

2. The door hinging mechanism as set forth in claim 1, further including: a latch for retaining the door in a closed position; and an energizing device mounted between the fixed door support structure and said four-bar linkage for actuating the door to an open position upon release of said latch.

3. A cam guided four-bar linkage mechanism for profiling the hinging operation of a door, comprising: a first link having a pivot at one end fixed to door support structure; a second link fixedly fastened along the door surface and pivotally connected at one end to the swinging end of said first link; a third link pivotally connected at one end to the other end of said second link; a fourth link having a fixed pivot mounting at one end in axial alignment with said first link pivot which is fixed to door support structure, and said fourth link having its swinging end pivotally connected to the other end portion of said third link; a camtrack mounted to fixed door support structure; a cam follower mounted to said third link and operatively engaging said camtrack for guiding the four-bar linkage mechanism to profile the opening and closing operation of the door about an imaginary hinge in space; and a cam release mechanism comprising, an arm pivoted to the door support structure and having its swinging end integral with said camtrack, and means for biasing said arm to a first position, whereat said cam follower remains in operative engagement with said camtrack, and said arm being manually rotatable against said biasing means to a second position, whereat said camtrack is removed from operative engagement with said cam follower.

4. A cam guided unequal length four-bar linkage mechanism for hinging a door of an overhead baggage stowage compartment in an airplane passenger section, said mechanism comprising: a first link having a pivot at one end fixed to stationary support structure for the door; a second link forming a support bracket fixedly fastened to the door and pivotally connected at one end to the swinging end of said first link; a third link pivotally connected at one end to the other end of said second link and being greater in length than said first link; a fourth link having a fixed pivot mounting at one end in axial alignment with said first link fixed pivot to door support structure and having its swinging end pivotally connected to the other end portion of said third link; a camtrack mounted to fixed door support structure; a follower mounted to said third link and operatively engaging said camtrack for guiding the four-bar linkage mechanism to profile the opening and closing operation of the door; and said first and third links being geometrically arranged to produce an imaginary projected intersection thereof throughout the opening and closing operation of the door, and which projected intersection is profiled by said camtrack to be retained within a limited area for producing the feel of a single point door hinge.

5. The door hinging mechanism as set forth in claim 4, further including: a latch for retaining the door in the closed position; and an energizing device mounted between fixed support structure and said four-bar linkage for actuating the door to the retracted position upon release of said latch.

6. A cam guided four-bar linkage mechanism for hinging a door of an overhead baggage stowage compartment in an airplane passenger section, said mechanism comprising: a first link having a pivot at one end fixed to stationary support structure for the door; a second link forming a support bracket fixedly fastened to the door and pivotally connected at one end to the swinging end of said first link; a third link pivotally connected at one end to the other end of said second link; a fourth link having a fixed pivot mounting at one end in axial alignment with said first link fixed pivot to door support structure and having its swinging end pivotally connected to the other end portion of said third link; a camtrack mounted to fixed door support structure; a follower mounted to said third link and operatively engaging said camtrack for guiding the four-bar linkage mechanism to profile the opening and closing operation of the door about an imaginary hinge in space; and a release mechanism permitting a lowering operation of the door for maintenance access to overhead fixtures in the airplane passenger section, said release mechanism comprising, an arm pivoted to the stationary support structure for the door and having its swinging end integral with said camtrack, and means for biasing said arm to a first position, whereat said cam follower remains in operative engagement with said camtrack and said arm being manually rotatable against said biasing means to a second position, whereat said camtrack is removed from operative engagement with said cam follower for permitting the lowering operation of the door.

* * * * *